(12) United States Patent
Salunke et al.

(10) Patent No.: US 11,459,866 B2
(45) Date of Patent: Oct. 4, 2022

(54) SYSTEMS AND METHODS FOR PREDICTING A SCREEN-OUT CONDITION IN AN EARTHEN FORMATION

(71) Applicant: BP Corporation North America Inc., Houston, TX (US)

(72) Inventors: Sarita Salunke, Houston, TX (US); Ivan Gil, Katy, TX (US); Laryssa Petry Ligocki, Richmond, TX (US); Bryan Dotson, Houston, TX (US)

(73) Assignee: BP CORPORATION NORTH AMERICA INC., Houston, TX (US)

( * ) Notice: Subject to any disclaimer, the term of this patent is extended or adjusted under 35 U.S.C. 154(b) by 123 days.

(21) Appl. No.: 17/026,872

(22) Filed: Sep. 21, 2020

(65) Prior Publication Data

US 2021/0087922 A1 Mar. 25, 2021

Related U.S. Application Data

(60) Provisional application No. 62/904,736, filed on Sep. 24, 2019.

(51) Int. Cl.
*E21B 43/267* (2006.01)
*E21B 47/06* (2012.01)
(Continued)

(52) U.S. Cl.
CPC ........ *E21B 43/267* (2013.01); *E21B 43/2605* (2020.05); *E21B 47/06* (2013.01);
(Continued)

(58) Field of Classification Search
CPC ...... E21B 47/06; E21B 43/2605; E21B 47/12; E21B 43/26; E21B 2200/22;
(Continued)

(56) References Cited

U.S. PATENT DOCUMENTS

2007/0168056 A1* 7/2007 Shayegi ............... G05B 13/048
700/48
2016/0273346 A1* 9/2016 Tang ..................... E21B 43/04
(Continued)

OTHER PUBLICATIONS

SPE-186174-MS, Semi Analytical Model for Predicting Proppant Screen-Out During Hydraulic Fracturing Unconventional Reservoirs., Society of Petroleum Engineers, 2017.
(Continued)

*Primary Examiner* — Brad Harcourt
(74) *Attorney, Agent, or Firm* — Conley Rose, P.C.

(57) ABSTRACT

A system for stimulating a well extending through a subterranean earthen formation includes a surface pump configured to pressurize a well stimulation fluid to a current surface pressure measurable by a surface sensor package, a well stimulation line extending between the surface pump and a wellhead positioned at an upper end of the well, wherein the well stimulation line is configured to flow the well stimulation fluid into the well, and a monitoring system in signal communication with the surface sensor package and including a screen-out predictor module stored in a memory of the monitoring system, wherein the screen-out predictor module is configured to predict a future surface pressure of the well stimulation fluid based on the current surface pressure measured by the surface sensor package, and wherein the monitoring system is configured to provide an indication of the predicted future surface pressure of the well stimulation fluid.

20 Claims, 6 Drawing Sheets

(51) Int. Cl.
  *E21B 47/12* (2012.01)
  *G06K 9/62* (2022.01)
  *G06N 3/08* (2006.01)
  *E21B 43/26* (2006.01)

(52) U.S. Cl.
  CPC ............ *E21B 47/12* (2013.01); *G06K 9/6262* (2013.01); *G06N 3/08* (2013.01)

(58) Field of Classification Search
  CPC ...... E21B 43/267; G06K 9/6262; G06N 3/08; G06N 3/0445; G06N 3/0454; G06N 5/003
  See application file for complete search history.

(56) References Cited

U.S. PATENT DOCUMENTS

| | | | |
|---|---|---|---|
| 2019/0323341 A1* | 10/2019 | Shen | E21B 47/107 |
| 2020/0072026 A1* | 3/2020 | Ray | G01V 9/00 |
| 2020/0407625 A1* | 12/2020 | Stephenson | E21B 43/26 |
| 2021/0017853 A1* | 1/2021 | Iriarte Lopez | E21B 47/06 |

OTHER PUBLICATIONS

SE-8297-PA, Interpretation of Fracturing Pressures, Society of Petroleum Engineers, 1981.

\* cited by examiner

SYSTEMS AND METHODS FOR PREDICTING A SCREEN-OUT CONDITION IN AN EARTHEN FORMATION

CROSS-REFERENCE TO RELATED APPLICATIONS

This application claims benefit of U.S. provisional application Ser. No. 62/904,736 filed Sep. 24, 2019, and entitled "Systems and Methods for Predicting a Screen-Out Condition in an Earthen Formation," which is hereby incorporated herein by reference in its entirety.

STATEMENT REGARDING FEDERALLY SPONSORED RESEARCH OR DEVELOPMENT

Not applicable.

BACKGROUND

Embodiments disclosed herein generally relate to wellbore designs and wellbore completion operations. More particularly, embodiments disclosed herein relate to systems and methods for predicting a screen-out condition in an earthen formation through which a wellbore extends during a formation stimulation or hydraulic fracturing operation.

Wellbores are drilled into subterranean earthen formations to facilitate the recovery of hydrocarbons from reservoirs within the earthen formation. In some applications, a drilled wellbore may be "completed" to enhance fluid conductivity or permeability between the wellbore and the hydrocarbon bearing reservoir. In some completion operations, a well stimulation or hydraulic fracturing system is employed to initiate and propagate hydraulic fractures in the subterranean formation extending from the wellbore to enhance fluid conductivity between the wellbore and the surrounding formation. For instance, a hydraulic fracturing fluid may be pumped down the wellbore against a desired location of the subterranean formation. The fluid is pressurized to a degree sufficient to initiate one or more fractures at the location along the formation.

The fracturing fluid often includes proppant, such as sand, to prevent the hydraulic fractures from closing following the conclusion of the hydraulic fracturing operation. In some instances, a condition known as "screen-out" may occur. In general, a screen out occurs when a sufficiently high concentration of proppant within the fracture causes the pumping pressure to exceed the design limits of the fracturing system. Under such conditions, the proppant may plug the fracture and stops the fracturing process. When a screen-out occurs, it may be necessary to discontinue pumping into the wellbore to prevent damaging equipment (e.g., the wellhead, casing, etc.) of the fracturing system.

SUMMARY

An embodiment of a system for stimulating a well extending through a subterranean earthen formation, the system comprising a surface pump configured to pressurize a well stimulation fluid to a current surface pressure measurable by a surface sensor package, a well stimulation line extending between the surface pump and a wellhead positioned at an upper end of the well, wherein the well stimulation line is configured to flow the well stimulation fluid into the well, and a monitoring system in signal communication with the surface sensor package and comprising a screen-out predictor module stored in a memory of the monitoring system, wherein the screen-out predictor module is configured to predict a future surface pressure of the well stimulation fluid based on the current surface pressure measured by the surface sensor package, and wherein the monitoring system is configured to provide an indication of the predicted future surface pressure of the well stimulation fluid. In some embodiments, the system further comprises a blending unit configured to provide a concentration of a diverting agent in the well stimulation fluid, wherein the screen-out predictor module of the monitoring system is configured to predict the future surface pressure of the well stimulation fluid based on the concentration of the diverting agent in the well stimulation fluid. In some embodiments, the screen-out predictor module of the monitoring system is configured to predict the future surface pressure of the well stimulation fluid based on at least one of a viscosity of the well stimulation fluid, geomechanical properties of the subterranean earthen formation, and a diameter of a casing string disposed in the well. In certain embodiments, the future surface pressure of the well stimulation fluid comprises the surface pressure of the well stimulation fluid predicted to occur at a future time that is between 5 and 15 minutes from a current time. In certain embodiments, the screen-out predictor module comprises an input block comprising an array of predictor variables comprising the current surface pressure of the well stimulation fluid, a neural network block comprising a neural network configured to receive the input variables from the input block and predict the future surface pressure based on the input variables, and an output block configured to indicate the future surface pressure predicted by the neural network block. In some embodiments, the neural network of the neural network block comprises a long short term memory (LSTM) encoder-decoder recurrent neural network. In some embodiments, the array of predictor variables of the input block comprise train-and-test data configured to train and test the neural network of the neural network block. In certain embodiments, the screen-out predictor module is configured to receive a proposed adjustment to a fluid property of the well stimulation fluid and to predict an alternative future surface pressure based on the proposed adjustment, wherein the predicted future surface pressure is different from the predicted alternative future surface pressure. In certain embodiments, the proposed adjustment comprises reducing a concentration of a diverting agent in the well stimulation fluid.

An embodiment of a method for stimulating a well extending through a subterranean formation, comprising (a) pressurizing a well stimulation fluid of a well stimulation system to a current surface pressure, (b) introducing the well stimulation fluid into the well extending through the subterranean formation, (c) predicting a future surface pressure of the well stimulation fluid based on the current surface pressure of the well stimulation fluid, and (d) providing an indication of the predicted future surface pressure. In some embodiments, the method further comprises (e) training a neural network using a first portion of train-and-test data comprising data collected from a previously performed well stimulation operation, and (f) testing the neural network using a second portion of the train-and-test data that is different from the first portion of the train-and-test data, wherein (c) comprises predicting the future surface pressure of the well stimulation fluid using the neural network. In certain embodiments, the train-and-test data collected from the previously performed well stimulation operation comprises a surface pressure of a well stimulation fluid of the previously performed well stimulation operation, a concentration of a diverting agent of the well stimulation fluid of the previously performed well stimulation operation, and geomechanical properties of a subterranean earthen formation stimulated during the previously performed well stimulation operation. In certain embodiments, (c) comprises predicting the future surface pressure of the well stimulation fluid using a long short term memory (LSTM) encoder-decoder recurrent neural network. In some embodiments, (c) comprises predicting the future surface pressure of the well stimulation fluid based on a concentration of a diverting agent in the well stimulation fluid. In some embodiments, the method further comprises (e) outputting a screen-out alarm based on the future surface pressure of the well stimulation fluid predicted by the screen-out predictor module. In some embodiments, (e) comprises (e1) determining the future surface pressure of the well stimulation fluid has increased continuously for a threshold period of time, (e2) determining a most recently predicted future surface pressure of the well stimulation fluid is greater than a baseline surface pressure of the well stimulation fluid, (e3) determining a percentage difference between the most recently predicted future surface pressure and a future surface pressure of the well stimulation fluid predicted at an initiation of the threshold period of time is greater than a threshold percentage, and (e4) determining the most recently predicted future surface pressure of the well stimulation fluid was predicted at least ten minutes from an initiation of (b). In certain embodiments, the method further comprises (e) predicting an alternative future surface pressure of the well stimulation fluid based on an adjustment to a fluid property of the well stimulation fluid, and (f) adjusting the fluid property of the well stimulation fluid.

A non-transitory machine-readable medium including instructions that, when executed by a processor, cause the processor to receive a current surface pressure of a well stimulation fluid pressurized by a surface pump of a well stimulation system, predict a future surface pressure of the well stimulation fluid based on the current surface pressure of the well stimulation fluid, and provide an indication of the future surface pressure of the well stimulation fluid. In some embodiments, the instructions, when executed by a processor, cause the processor to predict the future surface pressure of the well stimulation fluid using a long short term memory (LSTM) encoder-decoder recurrent neural network. In some embodiments, the instructions, when executed by a processor, cause the processor to predict an alternative future surface pressure of the well stimulation fluid based on an adjustment to a fluid property of the well stimulation fluid.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

Figure 1:
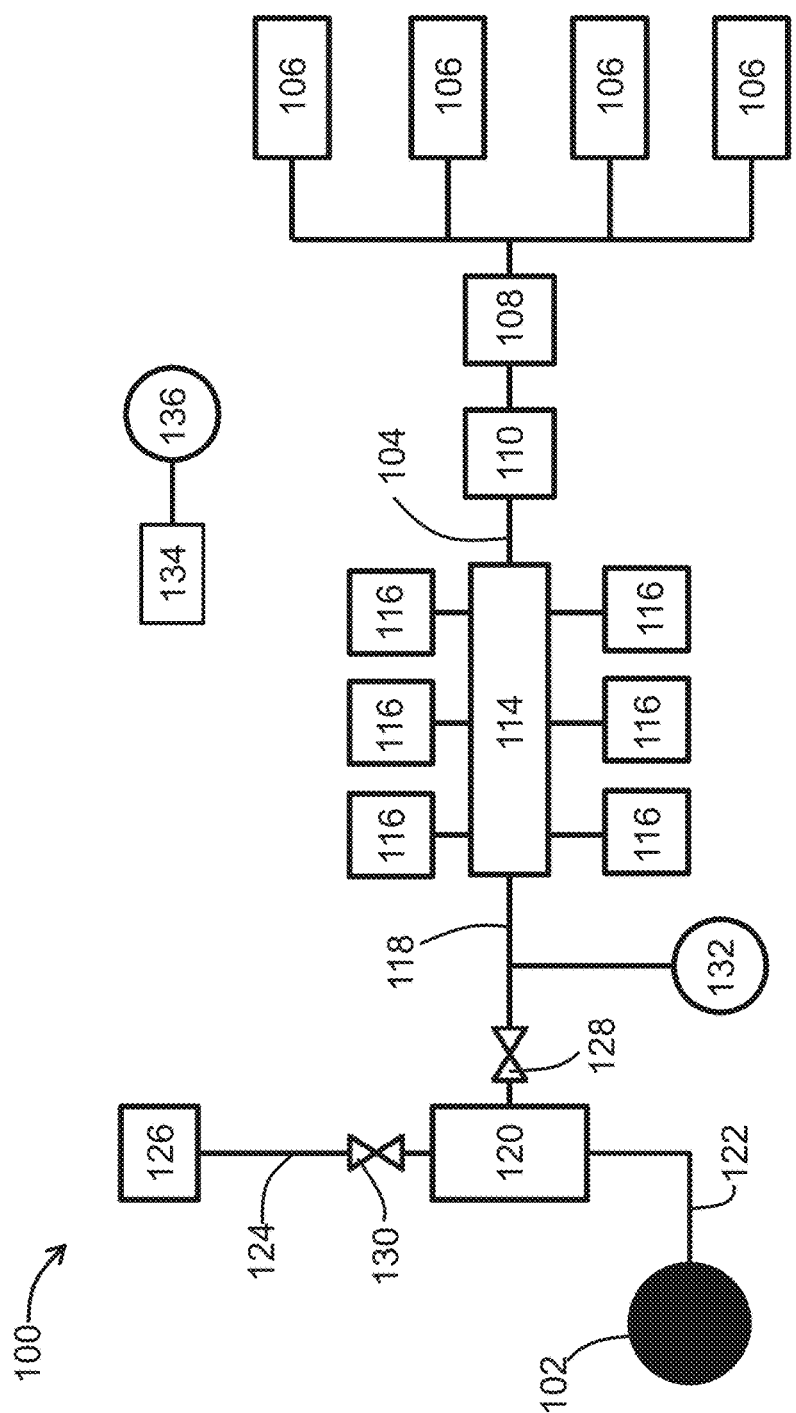
FIG. 1 is a schematic view of a well stimulation system for enhancing fluid connectivity between a well and a subterranean earthen formation in accordance with the principles disclosed herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a particular axis (e.g., central axis of a body or a port), while the terms "radial" and "radially" generally mean perpendicular to a particular axis. For instance, an axial distance refers to a distance measured along or parallel to the axis, and a radial distance means a distance measured perpendicular to the axis. Any reference to up or down in the description and the claims is made for purposes of clarity, with "up", "upper", "upwardly", "uphole", or "upstream" meaning toward the surface of the borehole and with "down", "lower", "downwardly", "downhole", or "downstream" meaning toward the terminal end of the borehole, regardless of the borehole orientation. As used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

As described above, a screen-out condition may occur during the hydraulic fracturing of an earthen formation whereby proppant suspended in a fracturing fluid may plug fractures formed in the earthen formation. The plugged fractures may cause pumping pressure to exceed design limits of a well stimulation or fracturing system used to perform the fracturing operation, potentially forcing an operator of the fracturing system to discontinue pumping of the fracturing fluid to prevent damaging equipment (e.g., the wellhead, casing, etc.) of the fracturing system. Thus, in addition to the risk of damaging equipment of the fracturing system, screen-outs may extend the time and expense required for performing the fracturing operation.

Accordingly, embodiments disclosed herein include systems and methods for stimulating a well extending through a subterranean formation that includes introducing a pressurized well stimulation fluid (e.g., a fracturing fluid) into a well extending through the subterranean formation, and predicting a future surface pressure of the well stimulation fluid based on a current surface pressure of the well stimulation fluid. In some embodiments, an impending screen-out condition may be predicted using the predicted surface pressure of the well stimulation fluid. An alarm indicating the impending screen-out condition may thus be provided to an operator of a well stimulation or fracturing system performing the well stimulation, allowing the operator to perform one or more remedial actions to prevent the predicted screen-out condition from occurring. For example, in response to receiving an alarm indicating a predicted screen-out condition, the operator may adjust one or more properties of the well stimulation fluid, such as a fluid flow rate, a surface pressure, a diverting agent concentration, etc., of the well stimulation fluid to thereby reduce the likelihood of the screen-out condition occurring.

In some embodiments, the operator may input one or more proposed remedial actions into a screen out predictor of the well stimulation system to provide a predicted future surface pressure of the well stimulation fluid that is revised based on the one or more proposed remedial actions inputted by the operator. In some embodiments, the proposed remedial action may comprise a proposed adjustment to one or more fluid properties of the well stimulation fluid. In this manner, the screen out predictor may provide feedback to the operator as to the impact in reducing the likelihood of future screen-out condition of one or more remedial actions proposed by the operator. This feedback may allow the operator to take only the remedial actions reasonably necessary to minimize the likelihood of a future screen-out condition and to avoid other remedial actions (e.g., the discontinuing of pumping of the well stimulation fluid altogether) that are unnecessary for preventing a screen-out condition, thereby minimizing the time and expense required for performing the well stimulation operation.

Figure 2:
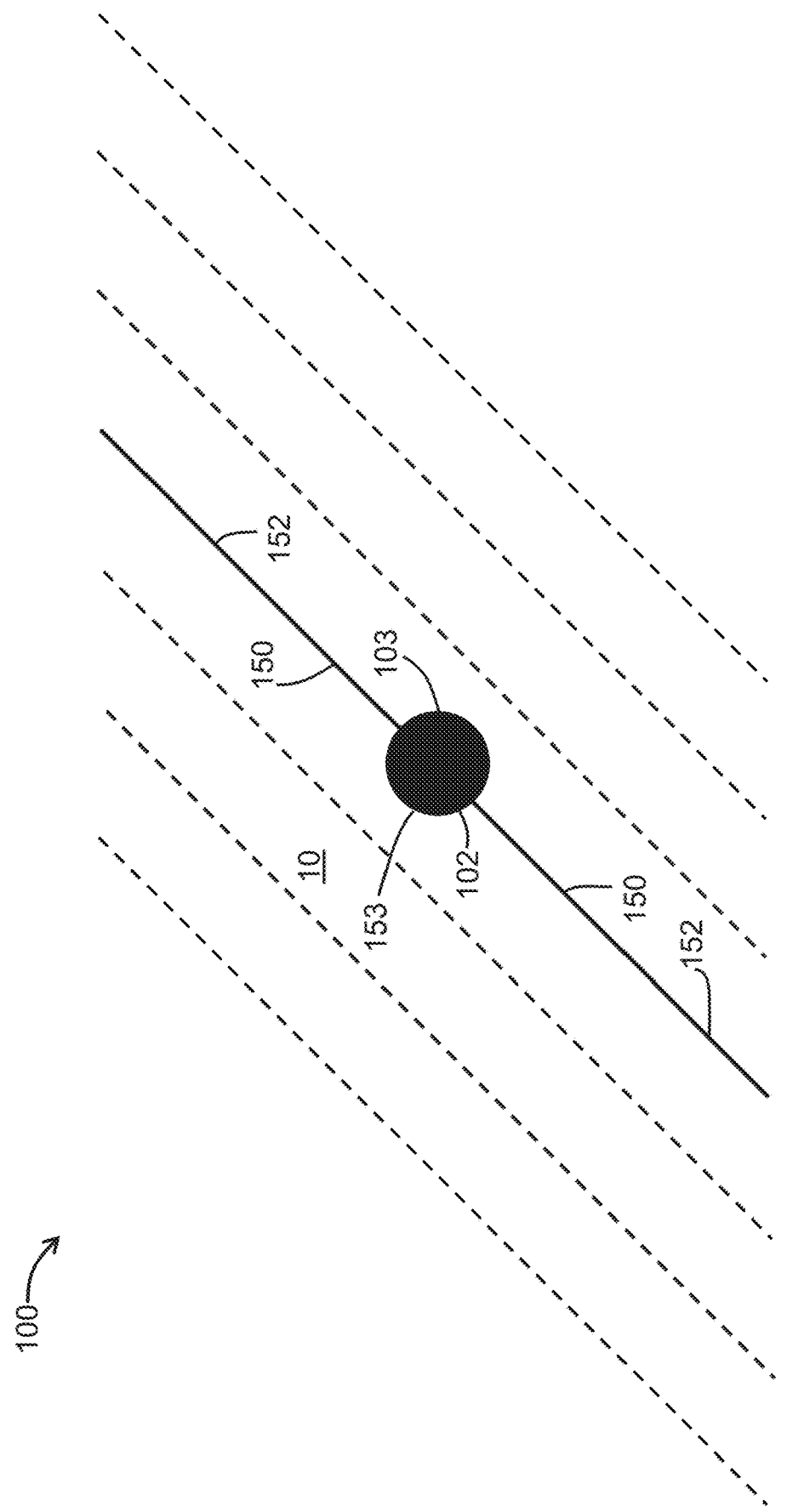
FIG. 2 is a schematic view of an embodiment of a dendritic fracture system formed by the well stimulation system of FIG. 1 and extending from the well of FIG. 1.

Referring now to FIGS. 1 and 2, an embodiment of a well stimulation or hydraulic fracturing system 100 is shown. Fracturing system 100 is generally configured to enhance fluid communication or connectivity between a wellbore or well 102 and a hydrocarbon bearing reservoir disposed in a subterranean earthen formation 10 (shown in FIG. 2) through which well 102 extends. In other words, the earthen formation 10 is disposed about the well 102. As will be discussed in more detail below, fracturing system 100 is used to initiate and propagate fractures in the earthen formation 10 extending radially from well 102 in response to the communication of pressurized hydraulic well stimulation or fracturing fluids into well 102. Such fractures in earthen formation 10 increase fluid connectivity between the well 102 and the targeted subterranean reservoir within earthen formation 10. Thus, fracturing system 100 is employed to perform well stimulation or hydraulic fracturing operations, and in particular, fracturing operations designed to increase the complexity of fractures formed in the earthen formation 10 to enhance fluid connectivity between the well 102 and the targeted reservoir within earthen formation 10.

As best shown in FIG. 1, fracturing system 100 may generally include a fracturing fluid supply conduit or manifold 104, a plurality of fluid storage tanks 106, a hydration unit 108, a blending unit 110, a fracturing manifold 114, a plurality of high pressure surface pumps 116, a high pressure well stimulation or fracturing line 118, a frac tree 120 (including a flow cross), a wellhead 122, a flowback line 124, and a flowback tank 126. Storage tanks 106 and units 108 and 110 are in series fluid communication with conduit 104. In the embodiment shown in FIG. 1, fluid storage tanks 106 store a base fluid (e.g., water) that is routed through the hydration unit 108 where chemicals, such as e.g., gelling agents, are added. After sufficient hydration time to allow for adequate mixing in hydration unit 108, the mixed fluid may travel to blending unit 110 and be blended with predetermined quantities of chemicals (e.g., acids, surfactants, gels, emulsifiers, viscosity reducers, friction reducers, etc.) and/or diverting agents provided by blending unit 110. In this embodiment, blending unit 110 supplies hydraulic fracturing system 100 with a permanent or non-dissolvable/non-biodegradable diverting agent, such as proppant (e.g., sand, etc.). Examples of suitable permanent diverting agents include, without limitation, 100 mesh proppant, walnut hulls, large grain size proppants (e.g., 8-16 to 40-70 mesh proppants), or any other particulate which remains in the reservoir. The permanent diverting agent(s) provided by blending unit 110 to the mixed fluid are designed to assist in preventing fracturing fluid from leaking into the earthen formation 10 from a fracture formed therein, and, as will be discussed further herein Referring still to FIG. 1, the blended well stimulation or hydraulic fracturing fluid provided by blending unit 110 is supplied to fracturing manifold 114, where the fracturing fluid may be routed through the plurality of surface pumps 116 to pressurize the fracturing fluid to a fracturing pressure sufficient to initiate or form one or more fractures in the earthen formation 10 through which the well 102 extends. In this embodiment, each fracturing pump 116 comprises a positive displacement pump powered by a power source such as a diesel engine, a gas turbine, or other devices known in the art; however, in other embodiments, the configuration of each fracturing pump 116 may vary. Accordingly, in at least this embodiment, shutting down or de-energizing the power source of each pump 116 holds each pump 116 stationary such that back pressure may be held within the well 102.

Following pressurization via surface pumps 116, the fracturing fluid may be routed from manifold 114 through high pressure fracturing line 118 into frac tree 120. Thus, high pressure fracturing line 118 extends and provides fluid communication between manifold 114 and frac tree 120. Frac tree 120 manages the flow and communication of fluid between well 102 and the components (e.g., high pressure fracturing line 118, flowback line 124, etc.) of fracturing system 100. In this embodiment, frac tree 120 comprises a flow cross and is coupled with high pressure fracturing line 118, flowback line 124, and wellhead 122; however, in other embodiments, the configuration of frac tree 120 may vary. Fluid communication between frac tree 120 and well 102 is provided by wellhead 122 disposed at the upper end of well 102 (at the surface). Wellhead 122 provides physical support for frac tree 120 as well as components of fracturing system 100 that extend into well 102, including, for example, a casing string (not shown in FIG. 1). The casing string provides structural support to well 102 and controls fluid communication between well 102 and the surrounding earthen formation 10 through which well 102 extends. Although well 102 is a cased well in this embodiment, in general, system 100 can be used in connection with cased or uncased wells.

In the arrangement described above and shown in FIG. 1, pressurized well stimulation or fracturing fluid is communicated from high pressure fracturing line 118, through frac tree 120, and into well 102 via wellhead 122. As will be discussed further herein, hydraulic fracturing system 100 also routes flowback fluid received from well 102 following the injection of pressurized fracturing fluid into well 102. Particularly, flowback fluid from well 102 may be routed through wellhead 122, frac tree 120, and into flowback tank 126 via flowback line 124 for storage in tank 126. In this embodiment, frac tree 120 includes a frac valve 128 for isolating high pressure fracturing line 118 when flowback fluid is flowed from well 102 into flowback tank 126 via flowback line 124. Additionally, frac tree 120 includes a flowback valve 130 for isolating flowback tank 126 when high pressure fracturing fluid is pumped into well 102 from high pressure fracturing line 118; however, in other embodiments, the configuration of frac tree 120 may vary.

Referring still to FIG. 1, high pressure fracturing line 118 includes a surface sensor package or assembly 132 to measure and indicate the fluid pressure of the fracturing fluid within high pressure fracturing line 118. In this embodiment, fluid injection or flow rate of pressurized fracturing fluid through high pressure fracturing line 118 may be determined by parameters pertaining to surface pumps 116 (i.e., speed, amount of fluid displaced each period, etc.), via surface sensor package 132.

In this embodiment, fracturing system 100 further includes a monitoring system 134 for monitoring various parameters of well 102 and equipment of fracturing system 100. Monitoring system 134 is in signal communication with surface sensor package 132 and other equipment of fracturing system 100. Monitoring system 134 is also in communication with an input/output (I/O) unit 136 (e.g., a graphical user interface, a touchscreen interface, or the like) for displaying information to an operator of fracturing system 100 and for receiving user inputs from the operator. The I/O unit 136 may display information related to the operation of fracturing system 100 and may receive user inputs related to operation of fracturing system 100. During operations, I/O unit 136 may communicate received user inputs to monitoring system 134, including the viscosity of the fracturing fluid supplied to well 102, and mesh size and density of the diverting agent provided by blending unit 110. Communication between the I/O unit 136 and monitoring system 134 may be wired, wireless, or a combination thereof.

Monitoring system 134 comprises any suitable device or assembly which is capable of receiving electrical (or other data) signals and transmitting electrical (or other data) signals to other devices. In particular, while not specifically shown, monitoring system 134 may comprise a computer system including a processor and a memory. The processor (e.g., microprocessor, central processing unit, or collection of such processor devices, etc.) may execute machine readable instructions (e.g., non-transitory machine readable medium) provided on the corresponding memory to provide the processor with all of the functionality described herein. The memory of monitoring system 134 may comprise volatile storage (e.g., random access memory), non-volatile storage (e.g., flash storage, read only memory, etc.), or combinations of both volatile and non-volatile storage. Data consumed or produced by the machine readable instructions can also be stored on the memory of monitoring system 134. A screen-out predictor tool or module is stored in the memory of monitoring system 134 and is executed by the processor of monitoring system 134. As will be described further herein, the screen-out predictor tool is generally configured to predict a potential screen-out condition in an earthen formation (e.g., earthen formation 10) during the performance of a well stimulation or hydraulic fracturing operation. Although in this embodiment monitoring system 134 comprises a component of the fracturing system 100 shown in FIG. 1, in other embodiments, monitoring system 134 may be utilized in well stimulation or fracturing systems which vary in configuration from fracturing system 100.

Hydraulic fracturing system 100 may be employed via methods discussed further herein to form a fracture system within earthen formation 10, as shown schematically in FIG. 2. Particularly, FIG. 2 schematically illustrates a horizontally extending (relative to the surface), subsurface portion of well 102 and the surrounding earthen formation 10 through which well 102 extends. Although in this embodiment well 102 of hydraulic fracturing system 100 includes a horizontal or deviated section, in other embodiments, well 102 may comprise a substantially vertical well.

As shown particularly in FIG. 2, by injecting fracturing fluid into well 102 at a sufficient pressure, fracturing system 100 may form a pair of primary fractures 152 within earthen formation 10. In this embodiment, fractures 152 extend from a generally cylindrical surface 153 of the well 102 in a bi-wing configuration. Fractures 152 generally comprise initial hydraulic (i.e., not natural) fractures formed in earthen formation 10 during a well stimulation or hydraulic fracturing operation performed by the hydraulic fracturing system 100 shown in FIG. 1.

Figure 3:
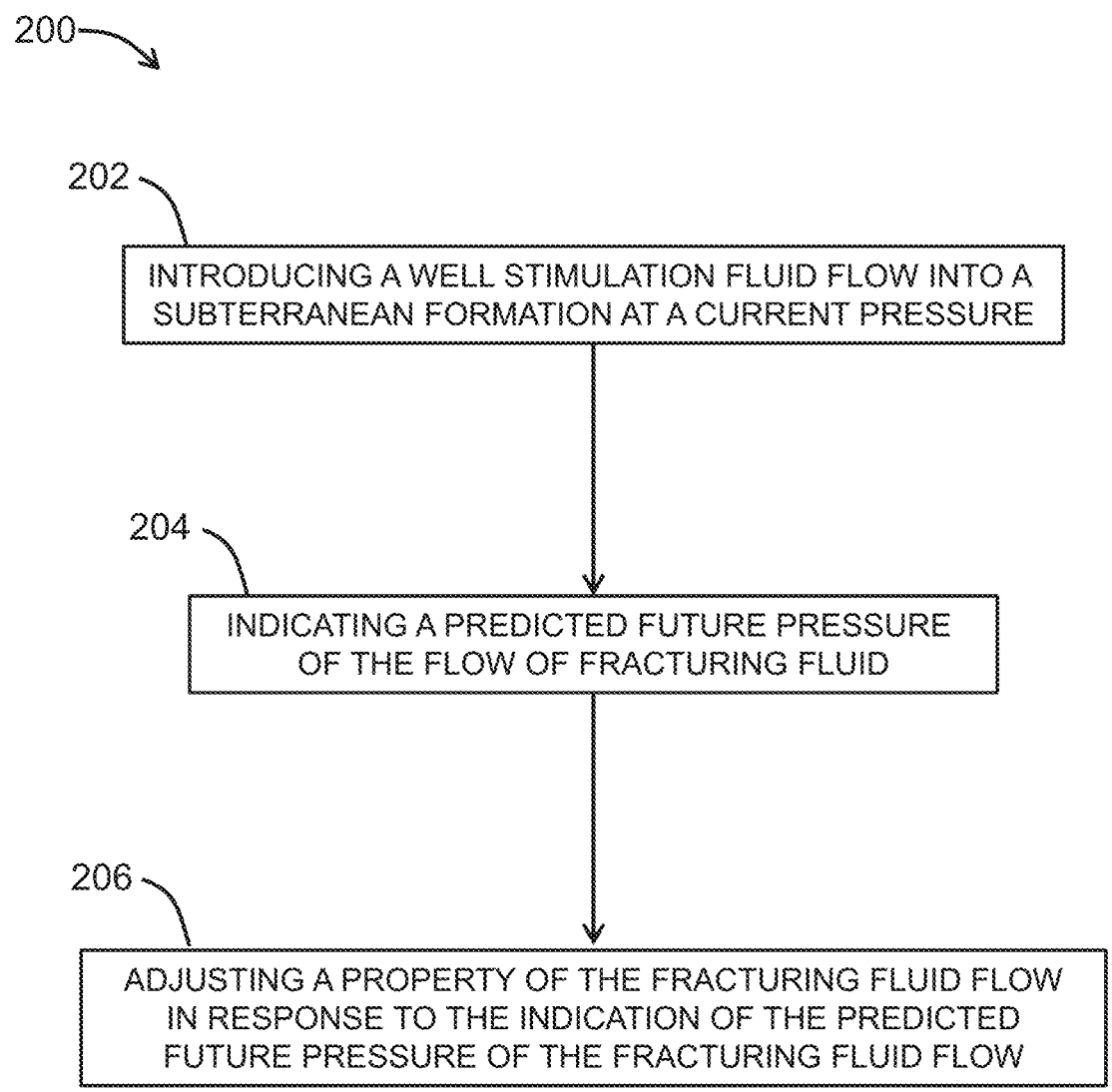
FIG. 3 is a flowchart of an embodiment of a method for stimulating a well extending through a subterranean formation in accordance with the principles disclosed herein.

Referring now to FIG. 3, an embodiment of a method 200 for stimulating a well (e.g., well 102) extending through a subterranean formation is shown. For convenience, the method 200 is described below as being performed on well 102 shown in FIG. 2 with the hydraulic fracturing system 100 shown in FIG. 1; however, method 200 may be employed using a variety of well stimulation or hydraulic fracturing systems that vary substantially from hydraulic fracturing system 100. For purposes of clarity and further explanation, method 200 is described below in conjunction with a fracturing fluid graph 220 shown in FIG. 4. However, the data presented in FIG. 4 is merely an example used for illustrative purposes, and actual surface pressure and flow rate data obtained during the performance of method 200 may vary substantially from the data presented in FIG. 4.

Figure 4:
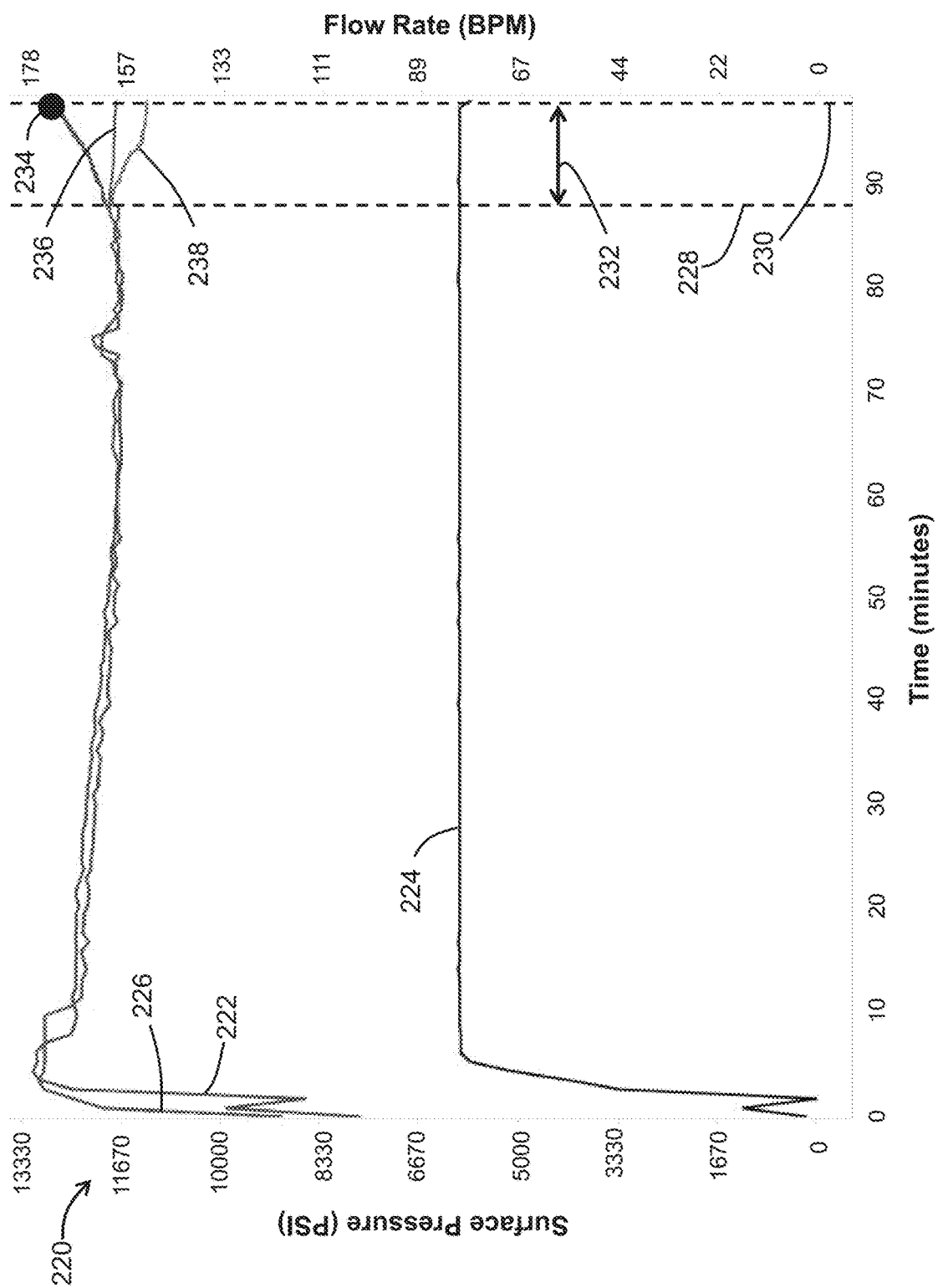
FIG. 4 is a graph of exemplary pressure and flowrate of a well stimulation fluid at a surface of a well in accordance with the principles disclosed herein.

Referring briefly to FIG. 4, on the fracturing fluid graph 220, a measured or current surface pressure 222 of the fracturing fluid in high pressure fracturing line 118 as a function of time is shown (expressed in pounds per square inch (PSI) on the left side Y-axis of fracturing fluid graph 220) and a measured or current flow rate 224 of the fracturing fluid in high pressure fracturing line 118 as a function of time is shown (expressed in barrels per minute (BPM) on the right side Y-axis) during an illustrative, non-limiting performance of method 200. In some embodiments, the current surface pressure 222 and current flow rate 224 are each measured by surface sensor package 132 of fracturing system 100. A predicted future surface pressure 226 of the fracturing fluid in high pressure fracturing line 118 as a function of time during the illustrative performance of method 200 is also shown in graph 220. As will be discussed further herein, current surface pressure 222 comprises a pumping cycle that corresponds with a fluid flow cycle of current flow rate 224. In some embodiments, multiple pumping and fluid flow cycles may be performed during the stimulation of a well (e.g., well 102) via hydraulic fracturing system 100. In this embodiment, fracturing fluid graph 220 shown in FIG. 4 comprises an illustrative visual output or indication provided by the I/O unit 136 of hydraulic fracturing system 100. Thus, graph 220 may be monitored in real-time by operators of the hydraulic fracturing system 100 using I/O unit 136. In other embodiments, the output provided by I/O unit 136 to an operator of fracturing system 100 may vary from that shown in FIG. 4.

Referring again to FIG. 3, method 200 begins at block 202 where a well stimulation or fracturing fluid flow is introduced into a subterranean formation at a current pressure. In an embodiment, block 202 of method 200 includes: (a) forming a composition of the fracturing fluid using fluid storage tanks 106, chemical unit 108, and/or blending unit 110; (b) pressurizing the formed fracturing fluid to a current pressure that is sufficient to hydraulically fracture subterranean formation 10 using surface pumps 116; (c) pumping the fracturing fluid at the current pressure into the well 102 via high pressure fracturing line 118, frac tree 120, and wellhead 122; and (d) directing the fracturing fluid against the wall 103 of the well 102 at a predetermined location of the well 102 (e.g., at a predetermined stage of a multi-stage fracturing operation, etc.). During the performance of block 202 of method 200, an operator of hydraulic fracturing system 100 may monitor the current surface pressure 222 and current flow rate 224 via the I/O unit 136 of hydraulic fracturing system 100. It should be appreciated that in other embodiments, the performance of block 202 of method 200 may vary from that described above and include fewer and/or additional steps.

At block 204 of method 200, a predicted future pressure of the flow of fracturing fluid is indicated. In an embodiment, block 204 of method 200 includes continuously determining the predicted future pressure of the flow of fracturing fluid and continuously indicating the predicted future pressure of the flow of fracturing fluid. For example, as the operator of hydraulic fracturing system 100 monitors the current surface pressure 222 of the flow of fracturing fluid at a given current time 228, the operator may at the same time also monitor the predicted surface pressure 226 which indicates at the current time 228 a predicted surface pressure of the flow of fracturing fluid at a particular future time 230. Particularly, as the operator of hydraulic fracturing system 100 continuously monitors the current surface pressure 222 in real-time, the operator may also continuously monitor the predicted future surface pressure 226 in real-time. As will be described further herein, the current time and the particular future time 230 may be separated by a fixed temporal interval.

In some embodiments, I/O unit 136 of hydraulic fracturing system 100 continuously indicates at a current or real-time both the current surface pressure 222 and the predicted future surface pressure 226 during the performance of block 202 of method 200. For example, as shown in FIG. 4, at a present or current time 228 of approximately 89 minutes from the initiation of block 202, I/O unit 136 indicates a current surface pressure 222 of approximately 11670 PSI. Additionally, at the current time 228, I/O unit also indicates the predicted future surface pressure 226 of approximately 13300 PSI via the I/O unit 136 of hydraulic fracturing system 100, where the future surface pressure 226 comprises a prediction of the surface pressure of the flow of fracturing fluid at a future time 230 of approximately 99 minutes from the initiation of block 202 (i.e., ten minutes into the future from the current time 228). In other words, at the current time 228 of approximately 89 minutes from the initiation of block 202 of method 200 I/O unit 136 indicates the predicted future surface pressure 226 predicted to occur at approximately 99 minutes from the initiation of block 202. Given that the current time 228 in the example illustrated in FIG. 4 is approximately 89 minutes from the initiation of block 202 of method 200, the line representing current surface pressure 222 in FIG. 4 terminates at the current time 228 of approximately 89 minutes whereas the line representing the predicted future surface pressure 226 in FIG. 4 terminates at the future time 230 of approximately 99 minutes from the initiation of block 202 of method 200.

The predicted future surface pressure 226 indicated by the I/O unit 136 of hydraulic fracturing system 100 continuously provides a prediction of the surface pressure of the flow of fracturing fluid (e.g., the flow of fracturing passing through fracturing line 118) at a fixed interval 232 in the future, where the fixed interval 232 comprises the fixed interval or difference between the current time 228 and the future time 230. In this embodiment, the fixed interval 232 between the current time 228 and the future time 230 is approximately ten minutes; however, in other embodiments, the duration of the fixed interval 232 may be greater or less than ten minutes. Thus, in this embodiment, I/O unit 136 of hydraulic fracturing system 100 continuously indicates, at the current time 228, a predicted future surface pressure 226 of the flow of fracturing fluid that is approximately ten minutes in the future from the present or current time 228. In an additional example, at a current time of approximately 60 minutes from the initiation of block 202 of method 200 the I/O unit 136 of hydraulic fracturing system 100 indicates both a current surface pressure 222 of 11670 PSI and a predicted future surface pressure 226 which is predicted to occur at approximately 70 minutes from the initiation of block 202.

Figure 5:
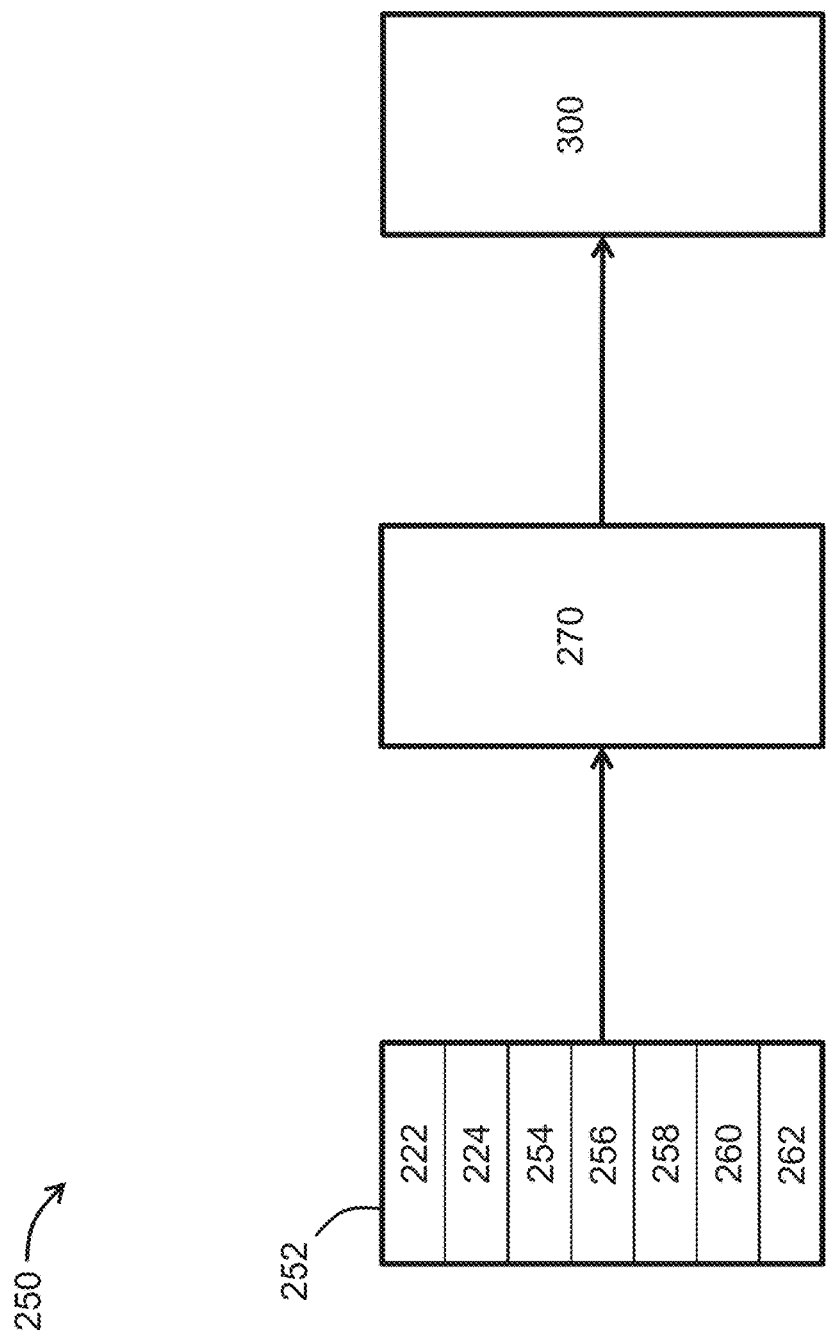
FIG. 5 is a schematic view of an embodiment of a screen-out predictor module of the well stimulation system of FIG. 1 in accordance with the principles disclosed herein.

The predicted future pressure of the flow of fracturing fluid determined at block 204 of method 200 may be determined by the screen-out predictor module of the monitoring system 134 of hydraulic fracturing system 100. Referring to FIG. 5, a flowchart of an embodiment of a screen-out predictor module 250 stored in the memory of the monitoring system 134 of hydraulic fracturing system 100 of FIG. 1 is shown in FIG. 5. In the embodiment of FIG. 5, screen-out predictor module 250 generally includes an input block 252, a neural network block 270, and an output block 300.

Input block 252 of screen-out predictor module 250 may comprise the input information or vector supplied to the neural network block 270 of screen-out predictor module 250. In this embodiment, the information included in input block 252 comprises current surface pressure 222 and current flow rate 224, diverting agent properties 254, fracturing fluid properties 256, chemical additive properties 258, formation properties 260, and completion properties 262. In other embodiments, the information included in input block 252 of the screen-out predictor module 250 may vary. Current surface pressure 222 and/or current flow rate 224 may be supplied to screen-out predictor module 250 via surface sensor package 132 of the hydraulic fracturing system 100 shown in FIG. 1. Diverting agent properties 254 of input block 252 may comprise the size (e.g., grain or mesh size) and/or concentration of diverting agents provided by blending unit 110 in the fracturing fluid pumped through high pressure fracturing line 118 into frac tree 120. Fracturing fluid properties 256 may include the fluid viscosity of the fracturing fluid pumped through high pressure fracturing line 118 as well as information pertaining to the type of base fluid stored in storage tanks 106. In this embodiment, fracturing fluid properties 256 are supplied to screen-out predictor module 250 by an operator of the hydraulic fracturing system 100; however, in other embodiments, this information may be supplied to screen-out predictor module 250 via other means. Chemical additive properties 260 include the types and properties thereof of chemical additives (e.g., friction reducers, viscosity reducers, etc.) added to the base fluid stored in storage tanks 206, such as the additives supplied by hydration unit 108 and/or blending unit 110. For example, friction reducers added to the fracturing fluid may generally reduce the amount of energy required to pump the fracturing fluid and thus may decrease a predicted surface pressure.

The formation properties 260 of the input block 252 of screen-out predictor module 250 may include geomechanical properties of earthen formation 10 including density, compressional and shear sonic velocity wave information (e.g., slowness time), etc. In some embodiments, at least some of the information included in formation properties 260, including compressional and shear sonic velocity wave information, is collected during the drilling of well 102 by measurement-while-drilling (MWD) and/or logging-while-drilling (LWD) tools coupled to a drill bit used to drill well 102. The completion properties 262 of input block 252 may include information pertaining to the design of well 102 once it has been completed. For example, completion properties 262 may include information pertaining to the size or diameter of the casing string position in well 102, the number of stages of well 102 to be fractured by the hydraulic fracturing system 100, as well as additional information. In some embodiments, the completion properties 262 of input block 252 are provided to screen-out predictor module 250 by an operator of hydraulic fracturing system 100 using I/O unit 136; however, in other embodiments, this information may be provided to screen-out predictor module 250 via other means. As will be described further herein, properties 222, 224, 254, 256, 258, 260, 262 of input block 252 may each define predictor variables received by neural network block 270 of screen-out predictor module 250. Thus, properties 222, 224, 254, 256, 258, 260, 262 may also be referred to herein as predictor variables 222, 224, 254, 256, 258, 260, 262.

Neural network block 270 of screen-out predictor module 250 is generally configured to receive input information from input block 252, generate or predict a predicted surface pressure of the flow of fracturing fluid based on the input information, and output the predicted surface pressure to the output block 300. In an embodiment, neural network block 270 comprises a Long Short Term Memory (LSTM) encoder-decoder recurrent neural network (referred to hereafter as the "LSTM neural network"); however, in other embodiments, neural network block 270 may comprise a neural network other than a LSTM neural network. For example, in an embodiment, neural network block 270 may comprise, for example, a recurrent neural network (RNN).

Prior to use in predicting future surface pressure of fracturing fluid and potential screen-out conditions, the LSTM neural network of network block 270 may be trained using train-and-test data including the predictor variables 222, 224, 254, 256, 258, 260, 262 described above. Thus, the predictor variables 222, 224, 254, 256, 258, 260, 262 of input block 252 may comprise train-and-test data used to train and test the LSTM neural network of neutral network block 270. Particularly, the train-and-test data used to construct the LSTM neural network is collected from a plurality of previously performed well stimulation or hydraulic fracturing operations employing hydraulic fracturing systems (e.g., systems similar to hydraulic fracturing system 100 shown in FIG. 1). Predictor variables 222, 224, 254, 256, 258, 260, 262 may be logged during the performance of the hydraulic fracturing operations and stored in a database or data lake accessible by the LSTM neural network.

Given that LSTM neural networks generally require the received input or train-and-test data to be in a three-dimensional format (e.g., samples, timesteps, features), the input data received by neural network block 270 is formatted into batches or "sequences" of observations, and thus, the LSTM neural network uses a sequence-to-sequence modeling technique to forecast the predicted future surface pressure of the fracturing fluid. For example, the input data received by neural network block 270 may be formatted into an array of shape X*Y*Z where "Z" comprises the number of predictor variables (e.g., predictor variables 222, 224, 254, 256, 258, 260, 262 of input block 252), "Y" comprises the sample size or number of consecutive observations of each predictor variable Z comprising each sequence, and "X" comprises the number of sequences Y. In some embodiments, a rolling window approach may be used to increase the number of observation samples (e.g., number of observation samples included in a Y sequence) used to train the LSTM neural network by creating a plurality of rolling window subsamples for each observation sample. For example, for a sample comprising N observations, the sample may be broken down into T−m+1 subsamples where the first rolling window includes observations for period 1 through m, the second rolling window including observations for period 2 through m+1, and so on and so forth.

The arrayed data (e.g., the X*Y*Z data array described above) comprises the train-and-test data described above for the LSTM neural network. In some embodiments, a train-and-test data split of 80%-20% is used such that 80% of the collected train-and-test data is used to train the LSTM neural network while the remaining 20% of the train-and-test data is used to test the performance of the neural network. In some embodiments, the collected train-and-test data is transformed before being used to test or train the LSTM neural network. For example, not intending to be bound by any theory, a min-max scalar may be used to transform the train-and-test data using the following computation, where "x" refers to an individual input or predictor variable (e.g., one of predictor variables 222, 224, 254, 256, 258, 260, 262) and "z" refers to the transformed input or predictor variable:

$$z = \frac{x - \min(x)}{\max(x) - \min(x)} \quad (1)$$

In some embodiments, the min-max scalar, such as the function shown in Equation (1) above is only used to transform the portion of the train-and-test data used to train the LSTM neural network so as not to comingle the portion of the train-and-test data used to test the LSTM neural network with the portion of the data used to train the neural network. In some embodiments, the LSTM neural network may comprise a LSTM neural network having the parameters listed in Table 1 below:

TABLE 1

| | |
|---|---|
| LSTM Layers: | 3 |
| Number of memory units: | 200/LSTM layer, 100/Dense layer |
| Number of Epochs: | 50 |
| Loss: | Mean Squared Error |
| Optimizer: | Adam Optimization Algorithm |

In some embodiments, an initial LSTM neural network may be first tested on the unseen, test portion of the train-and-test data. Following the initial testing, parameter optimization of the LSTM neural network via hyperparameter tuning may be conducted to optimize the performance of the LSTM neural network with respect to a set of given hyperparameters. For example, one or more of a Grid Search, a Random Search, and Bayesian Optimization approaches may be utilized for optimizing the set of hyperparameters. The LSTM neural network may be trained following the optimization of the set of hyperparameters to thereby provide a set of optimized model parameters for the LSTM neural network. Additionally, during training of the LSTM neural network, callback functions, such as the EarlyStopping and/or CheckPoints callback functions may be employed to minimize validation loss.

Once the LSTM neural network has been trained using the collected train-and-test data, the most accurate version of the LSTM neural network (e.g., in terms of having the lowest mean absolute error (MAE), mean absolute percentage error (MAPE), and/or root mean square error (RMSE), etc.) is selected for use as the LSTM neural network of the neural network block 270 of screen-out predictor module 250. Thus, in some embodiments, the most accurate LSTM neural network is saved in the memory of the monitoring system 134 of the hydraulic fracturing system 100 shown in FIGS. 1, 2.

In some embodiments, the neural network block 270 of screen-out predictor module 250 may comprise multiple neural networks, each neural network receiving predictor variables from input block 252, to more accurately predict the future surface pressure of the fracturing fluid. Particularly, the neural network block 270 of screen-out predictor module 250 may include a "pre-diverter" neural network and a "post-diverter" neural network where the pre-diverter neural network is trained and tested using only pre-diverter train-and-test data (train-and-test data pertaining to the fracturing of a well prior to the delivery of a diverter) whereas the post-diverter neural network is trained and tested using only post-diverter train-and-test data (train-and-test data pertaining to the fracturing of a well following the delivery of a diverter). For example, during a hydraulic fracturing operation, the fracturing fluid may initially be pumped into the well for a first or pre-diverter time period without any diverting agents in order to initiate one or more fractures in the subterranean earthen formation. Following the pre-diverter time period, diverting agents are added to the fracturing fluid and pumped into the well during a second or post-diverter time period to thereby initiate fractures in addition to the fractures initiated during the pre-diverter time period. By training and testing a neural network specific to the pre-diverter and post-diverter time periods, surface pressure of the fracturing fluid may be more accurately predicted by the pre-diverter and post-diverter neural networks.

At output block 300 of screen-out predictor module 250, the predicted surface pressure generated or predicted by neural network block 270 is outputted or indicated to an operator of a hydraulic fracturing system 100. For example, in some embodiments, output block 300 is configured to output a graph (e.g., similar to graph 220 shown in FIG. 4) to the I/O unit 136 of hydraulic fracturing system 100 to thereby visually indicate the predicted surface pressure generated by neural network block 270 to an operator of hydraulic fracturing system 100.

In some embodiments, output block 300 is configured to output an alarm (e.g., an audible or visual alarm) to an operator of a hydraulic fracturing system in response to neural network block 270 generating a screen-out prediction. For example, in some embodiments, output block 300 is configured to visually indicate an alarm comprising the screen-out prediction. Output block 300 may output an alarm predicting a future screen-out condition (i.e., a "screen-out alarm") using the predicted future surface pressure provided by the neural network block 270 and a predefined set of conditions which must be satisfied in order for the screen-out alarm to be issued. For example, in some embodiments, output block 300 is configured to output a screen-out alarm if the following conditions are met: (1) predicted future surface pressure of the fracturing fluid increases continuously for a threshold period of time (e.g., approximately five minutes in some embodiments); (2) the most recent predicted future surface pressure generated by neural network block 270 is greater than a baseline threshold pressure; (3) the percentage difference between the most recent predicted future surface pressure and the predicted surface pressure generated by neural network block 270 generated at the initiation of the threshold time period is greater than a predetermined or threshold percentage (e.g., approximately 0.5%-2% in some embodiments); and (4) the most recent predicted surface pressure generated by neural network block 270 was generated at least approximately 13-17 minutes (e.g., 15 minutes in some embodiments) from the initial pumping of fracturing fluid through a well (e.g., step (c) of the block 202 of method 200 shown in FIG. 3).

In some embodiments, the baseline threshold pressure of condition (2) above comprises an average surface pressure of the fracturing fluid at an initial or baseline interval of the hydraulic fracturing operation where surface pressure of the fracturing fluid has had sufficient time to increase to a sufficient pressure to hydraulically fracture the subterranean formation (e.g., formation 10 shown in FIG. 2) but early enough in the fracturing operation where a screen-out condition is unlikely to occur. In some embodiments, the baseline threshold pressure comprises the average surface pressure of the fracturing fluid between the 10th and 20th minutes from the initiation of the block 202 of method 200 shown in FIG. 3.

Thus, as an example, output block 300 may output a screen-out alarm indicative of a predicted screen-out condition where the predicted future surface pressure of the fracturing fluid increases continuously from 12,000 PSI to 13,000 PSI for five minutes (five minutes being the threshold period of time in this example); the baseline threshold pressure is approximately 11,500 PSI; the most recent predicted future surface pressure generated by neural network block 270 is approximately 13,000 PSI (thus greater than the baseline threshold pressure); the percentage difference between the most recent predicted future surface pressure and the predicted surface pressure is 8.3% (i.e., 100*(13,000 PSI-12,000 PSI)/(12,000 PSI)) which is greater than the 1% threshold percentage in this example; and the 13,000 PSI predicted surface pressure, being the most recent predicted surface pressure generated by neural network block 270, was generated approximately 97 minutes from the initial pumping of fracturing fluid through the well, which is later than 13-17 from the initial pumping of fracturing fluid through the well.

An exemplary screen-out alarm 234 is depicted on graph 220 of FIG. 4. In particular, the screen-out alarm 234 is indicated to an operator of the hydraulic fracturing system (e.g., hydraulic fracturing system 100 shown in FIGS. 1, 2) at approximately 87 minutes from the initiation of the hydraulic fracturing operation (e.g., approximately 87 minutes from step (c) of the block 202 of method 200 shown in FIG. 3), where the potential screen-out condition is predicted or forecasted to occur by screen-out alarm 234 at approximately 97 minutes from the initiation of the hydraulic fracturing operation.

Referring again to FIG. 3, as the predicted future pressure of the flow of fracturing fluid is indicated at block 204, method 200 also includes adjusting a property of the fracturing fluid flow in response to the indication of the predicted future pressure of the fracturing fluid flow at block 206. In some embodiments, block 206 comprises adjusting a property of the fracturing fluid flowing through high pressure fracturing line 118 of hydraulic fracturing system 100 in response to the indication to an operator of system 100 of the predicted future surface pressure of the fracturing fluid, the indication being provided by I/O unit 136 and monitoring system 134 of hydraulic fracturing system 100. Block 206 may comprise adjusting a property of the fracturing fluid through high pressure fracturing line 118 in response to I/O unit 136 and monitoring system 134 producing a screen-out alarm (e.g., a screen-out alarm similar to screen-out alarm 234 shown in FIG. 4). For example, in response to an elevated predicted future surface pressure (or an issuance of a screen-out alarm) provided by I/O unit 136 and monitoring system 134, an operator of hydraulic fracturing system 100 may adjust a fluid property of the fracturing fluid, where "fluid property" of the fracturing fluid includes fluid flow rate, surface pressure, diverting agent concentration, and additional fluid properties such as composition of the fracturing fluid. Particularly, the operator of hydraulic fracturing system 100 may take a proposed "moderate action" by, for example, reducing the concentration of diverting agents provided by blending unit 110 in the fracturing fluid pumped through high pressure fracturing line 118 to thereby reduce the likelihood of a future screen-out condition in well 102. Alternatively, in a scenario where a screen-out condition may only be avoided via more significant action than reducing the concentration of diverter agents in the fracturing fluid, the operator may, for example, take a proposed "significant action," by eliminating the presence of diverter agents in the fracturing fluid for a period of time, adjusting a pumping schedule of the hydraulic fracturing operation to improve diverting agent loading and fracture efficiency, and/or reducing or ceasing the pumping of fracturing fluid into well 102. Thus, the proposed actions may comprise proposed adjustments to one or more fluid properties of the well stimulation fluid.

In some embodiments, an operator of fracturing fluid system 100 may input a moderate and/or significant action into monitoring system 134 via I/O unit 136 to adjust the predicted future surface pressure outputted by the monitoring system 134 to determine how the moderate and/or significant action affects the predicted future surface pressure outputted by monitoring system 134 prior to taking the moderate and/or significant action. For example, and with particular reference to FIG. 4, the operator may enter into I/O unit 136 at current time 228 a moderate action comprising, for example, reducing the concentration of diverter agents provided by blending unit 110 in the fracturing fluid pumped through high pressure fracturing line 118. In response to the operator inputting the moderate action to I/O unit 136, the monitoring unit 134 outputs (via I/O unit 136) a first alternative predicted surface pressure 236 (depicted on graph 220) over the fixed interval 232, where the first alternative predicted surface pressure 236 is different from the predicted future surface pressure 226. The first alternative predicted surface pressure 236 may provide guidance to the operator as to whether the proposed moderate action will successfully minimize the risk of a future screen-out condition.

Similarly, the operator may enter into I/O unit 136 at current time 228 a significant action comprising eliminating the presence of diverter agents provided by blending unit 110 in the fracturing fluid pumped through high pressure fracturing line 118. For example, the operator may enter the proposed significant action into I/O unit 136 in response to the first alternative predicted surface pressure 236 indicating that a screen-out may occur in spite of taking a proposed moderate action.

In response to the operator inputting the significant action to I/O unit 136, the monitoring unit 134 outputs (via I/O unit 136) a second alternative predicted surface pressure 238 (depicted on graph 220) over the fixed interval 232, where the second alternative predicted surface pressure 238 is different from both the first alternative predicted surface pressure 236 and the predicted future surface pressure 226. Particularly, the second alternative predicted surface pressure 238 is continuously less over fixed interval 232 than the first alternative predicted surface pressure 236, and first alternative predicted surface pressure 236 is continuously less than predicted future surface pressure 226 over fixed interval 232. In this manner, the operator of hydraulic fracturing system 100 may compare the predicted future surface pressure 226 with the alternative predicted surface pressures 236, 238, respectively, to determine how to avoid a potential screen-out condition while maximizing the amount of diverting agents delivered to well 102.

In some embodiments, the first and second alternative predicted surface pressures 236, 238, respectively, are produced by monitoring unit 134 by adjusting one or more of the predictor variables 222, 224, 254, 256, 258, 260, 262 supplied by input block 252 to the neural network block 270 of screen-out predictor module 250. For example, the predictor variable 256 comprising diverting agent properties may be adjusted to reflect the reduction in concentration (corresponding to the moderate action) or elimination (corresponding to the significant action) of diverting agents from the fracturing fluid pumped into well 102.

Although monitoring system 134 is described herein in the context of a well stimulation operation performed using the hydraulic fracturing system 100 shown in FIG. 1, in other embodiments, monitoring system 134, may be employed in applications other than well stimulation or hydraulic fracturing operations for predicting future surface pressure and potential screen-out conditions. For example, monitoring system 134 may be employed in a gravel or "frac" packing operation. Particularly, monitoring system 134 may be employed in a gravel or frac packing operation to avoid a premature screen-out condition. By avoiding a premature screen-out using monitoring system 134 the amount of diverting agents (e.g., gravel pack "sand") pumped into an annulus formed between a downhole screen of the gravel/frac pack system and a wall of the wellbore may be maximized to ensure minimal leakage of formation sand into the wellbore.

Figure 6:
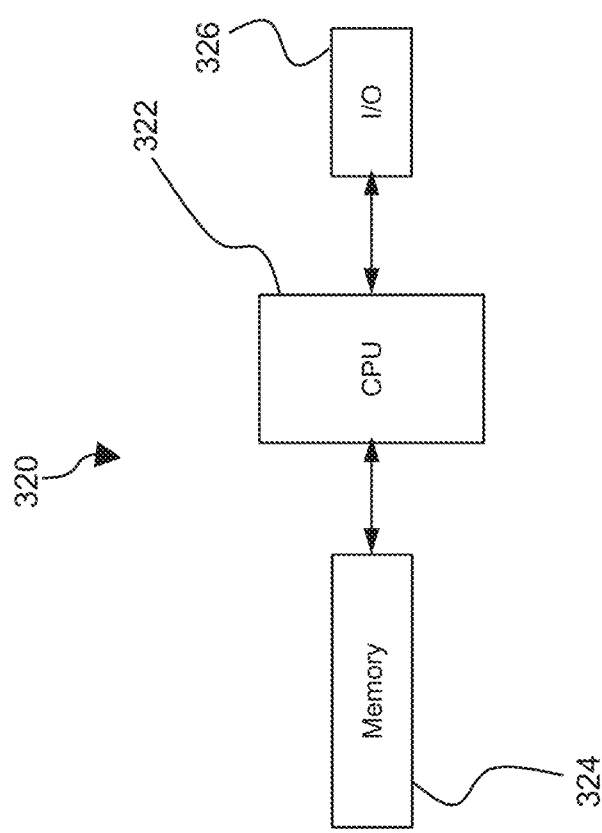
FIG. 6 is a block diagram of an embodiment of a computer system in accordance with the principles disclosed herein.

Referring to FIG. 6, an embodiment of a computer system 320 suitable for implementing one or more embodiments disclosed herein is shown. For example, the monitoring system 134 shown in FIG. 1 may be configured in a manner similar to the computer system 320 shown in FIG. 6. The computer system 320 includes a processor 322 (which may be referred to as a central processor unit or CPU) that is in communication with one or more memory devices 324, and input/output (I/O) devices 326. The processor 322 may be implemented as one or more CPU chips. The memory devices 324 of computer system 320 may include secondary storage (e.g., one or more disk drives, etc.), a non-volatile memory device such as read only memory (ROM), and a volatile memory device such as random access memory (RAM). In some contexts, the secondary storage ROM 306, and/or RAM comprising the memory devices 324 of computer system 320 may be referred to as a non-transitory computer readable medium or a computer readable storage media. I/O devices 3326 may include printers, video monitors, liquid crystal displays (LCDs), touch screen displays, keyboards, keypads, switches, dials, mice, and/or other well-known input devices.

It is understood that by programming and/or loading executable instructions onto the computer system 320, at least one of the CPU 322, the memory devices 324 are changed, transforming the computer system 320 in part into a particular machine or apparatus having the novel functionality taught by the present disclosure. Additionally, after the computer system 320 is turned on or booted, the CPU 322 may execute a computer program or application. For example, the CPU 322 may execute software or firmware stored in the memory devices 324. The software stored in the memory devices 324 and executed by CPU 322 may comprise the screen-out predictor module 250 shown in FIG. 5. During execution, an application may load instructions into the CPU 322, for example load some of the instructions of the application into a cache of the CPU 322. In some contexts, an application that is executed may be said to configure the CPU 322 to do something, e.g., to configure the CPU 322 to perform the function or functions promoted by the subject application. When the CPU 302 is configured in this way by the application, the CPU 322 becomes a specific purpose computer or a specific purpose machine.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A system for stimulating a well extending through a subterranean earthen formation, the system comprising:
a surface pump configured to pressurize a well stimulation fluid to a current surface pressure measurable by a surface sensor package;
a well stimulation line extending between the surface pump and a wellhead positioned at an upper end of the well, wherein the well stimulation line is configured to flow the well stimulation fluid into the well; and
a monitoring system in signal communication with the surface sensor package and comprising a screen-out predictor module stored in a memory of the monitoring system, wherein the screen-out predictor module is configured to predict a future surface pressure of the well stimulation fluid based on the current surface pressure measured by the surface sensor package, and wherein the monitoring system is configured to provide an indication of the predicted future surface pressure of the well stimulation fluid.

2. The system of claim 1, further comprising:
a blending unit configured to provide a concentration of a diverting agent in the well stimulation fluid;
wherein the screen-out predictor module of the monitoring system is configured to predict the future surface pressure of the well stimulation fluid based on the concentration of the diverting agent in the well stimulation fluid.

3. The system of claim 1, wherein the screen-out predictor module of the monitoring system is configured to predict the future surface pressure of the well stimulation fluid based on at least one of a viscosity of the well stimulation fluid, geomechanical properties of the subterranean earthen formation, and a diameter of a casing string disposed in the well.

4. The system of claim 1, wherein the future surface pressure of the well stimulation fluid comprises the surface pressure of the well stimulation fluid predicted to occur at a future time that is between 5 and 15 minutes from a current time.

5. The system of claim 1, wherein the screen-out predictor module comprises:
an input block comprising an array of predictor variables comprising the current surface pressure of the well stimulation fluid;
a neural network block comprising a neural network configured to receive the input variables from the input block and predict the future surface pressure based on the input variables; and
an output block configured to indicate the future surface pressure predicted by the neural network block.

6. The system of claim 5, wherein the neural network of the neural network block comprises a long short term memory (LSTM) encoder-decoder recurrent neural network.

7. The system of claim 5, wherein the array of predictor variables of the input block comprise train-and-test data configured to train and test the neural network of the neural network block.

8. The system of claim 1, wherein the screen-out predictor module is configured to receive a proposed adjustment to a fluid property of the well stimulation fluid and to predict an alternative future surface pressure based on the proposed adjustment, wherein the predicted future surface pressure is different from the predicted alternative future surface pressure.

9. The system of claim 8, wherein the proposed adjustment comprises reducing a concentration of a diverting agent in the well stimulation fluid.

10. A method for stimulating a well extending through a subterranean formation, comprising:

(a) pressurizing a well stimulation fluid of a well stimulation system to a current surface pressure;
(b) introducing the well stimulation fluid into the well extending through the subterranean formation;
(c) predicting a future surface pressure of the well stimulation fluid based on the current surface pressure of the well stimulation fluid; and
(d) providing an indication of the predicted future surface pressure.

11. The method of claim 10, further comprising:
(e) training a neural network using a first portion of train-and-test data comprising data collected from a previously performed well stimulation operation; and
(f) testing the neural network using a second portion of the train-and-test data that is different from the first portion of the train-and-test data;
wherein (c) comprises predicting the future surface pressure of the well stimulation fluid using the neural network.

12. The method of claim 11, wherein the train-and-test data collected from the previously performed well stimulation operation comprises:
a surface pressure of a well stimulation fluid of the previously performed well stimulation operation;
a concentration of a diverting agent of the well stimulation fluid of the previously performed well stimulation operation; and
geomechanical properties of a subterranean earthen formation stimulated during the previously performed well stimulation operation.

13. The method of claim 10, wherein (c) comprises predicting the future surface pressure of the well stimulation fluid using a long short term memory (LSTM) encoder-decoder recurrent neural network.

14. The method of claim 10, wherein (c) comprises predicting the future surface pressure of the well stimulation fluid based on a concentration of a diverting agent in the well stimulation fluid.

15. The method of claim 10, further comprising:
(e) outputting a screen-out alarm based on the future surface pressure of the well stimulation fluid predicted by the screen-out predictor module.

16. The method of claim 15, wherein (e) comprises:
(e1) determining the future surface pressure of the well stimulation fluid has increased continuously for a threshold period of time;
(e2) determining a most recently predicted future surface pressure of the well stimulation fluid is greater than a baseline surface pressure of the well stimulation fluid;
(e3) determining a percentage difference between the most recently predicted future surface pressure and a future surface pressure of the well stimulation fluid predicted at an initiation of the threshold period of time is greater than a threshold percentage; and
(e4) determining the most recently predicted future surface pressure of the well stimulation fluid was predicted at least ten minutes from an initiation of (b).

17. The method of claim 10, further comprising:
(e) predicting an alternative future surface pressure of the well stimulation fluid based on an adjustment to a fluid property of the well stimulation fluid; and
(f) adjusting the fluid property of the well stimulation fluid.

18. A non-transitory machine-readable medium including instructions that, when executed by a processor, cause the processor to:
receive a current surface pressure of a well stimulation fluid pressurized by a surface pump of a well stimulation system;
predict a future surface pressure of the well stimulation fluid based on the current surface pressure of the well stimulation fluid; and
provide an indication of the future surface pressure of the well stimulation fluid.

19. The non-transitory machine-readable medium of claim 18, wherein the instructions, when executed by a processor, cause the processor to predict the future surface pressure of the well stimulation fluid using a long short term memory (LSTM) encoder-decoder recurrent neural network.

20. The non-transitory machine-readable medium of claim 18, wherein the instructions, when executed by a processor, cause the processor to predict an alternative future surface pressure of the well stimulation fluid based on an adjustment to a fluid property of the well stimulation fluid.

* * * * *